(12) United States Patent
Su et al.

(10) Patent No.: US 10,465,731 B2
(45) Date of Patent: Nov. 5, 2019

(54) SCREW

(71) Applicant: TAIWAN SHAN YIN INTERNATIONAL CO., LTD., Kaohsiung (TW)

(72) Inventors: Kou-Tsair Su, Kaohsiung (TW); Yu-Jung Su, Kaohsiung (TW)

(73) Assignee: Taiwan Shan Yin International Co., Ltd., Kaohsiung (TW)

( * ) Notice: Subject to any disclaimer, the term of this patent is extended or adjusted under 35 U.S.C. 154(b) by 120 days.

(21) Appl. No.: 15/725,493

(22) Filed: Oct. 5, 2017

(65) Prior Publication Data
US 2019/0107137 A1 Apr. 11, 2019

(51) Int. Cl.
F16B 25/10 (2006.01)
F16B 25/00 (2006.01)

(52) U.S. Cl.
CPC ........ F16B 25/103 (2013.01); F16B 25/0057 (2013.01); F16B 25/0089 (2013.01); F16B 25/0015 (2013.01); F16B 25/0052 (2013.01)

(58) Field of Classification Search
CPC ............... F16B 25/103; F16B 25/0052; F16B 25/0015; F16B 25/0068; F16B 25/0073; F16B 25/0084; F16B 25/0078
See application file for complete search history.

(56) References Cited

U.S. PATENT DOCUMENTS

| | | | | |
|---|---|---|---|---|
| 3,710,676 A * | 1/1973 | Ringland | ............ | F16B 25/0021 411/387.7 |
| 4,241,638 A * | 12/1980 | Shimizu | ............... | F16B 25/0031 411/386 |
| 4,645,396 A * | 2/1987 | McCauley | .......... | F16B 25/0031 408/224 |
| 4,655,661 A * | 4/1987 | Brandt | ................ | F16B 25/0031 408/224 |
| 4,781,506 A * | 11/1988 | Roberts | ............... | F16B 25/0084 408/230 |

(Continued)

FOREIGN PATENT DOCUMENTS

TW I314188 B 9/2009
TW M401068 4/2011
(Continued)

Primary Examiner — Robert Sandy
Assistant Examiner — Rowland Do
(74) Attorney, Agent, or Firm — Rosenberg, Klein & Lee

(57) ABSTRACT

A screw includes a shank, a head connected thereto, a drilling portion opposite to the head, a first threaded section spirally formed on the shank, and a leading threaded section spirally extending upwards from the drilling portion. The two threaded section are disconnected so that a valley is formed between them. At least one cutting unit protrudes from the valley and has two ends connected to the first threaded section and the leading threaded section respectively. The leading threaded section assists the drilling portion in cutting and drilling into an object while screwing, and the cutting unit protruding from the valley severs fibers which are not cut by the leading threaded section completely to prevent the entanglement of the fibers. The valley helps accommodate and evacuate cut chips. Therefore, the drilling resistance is reduced effectively to increase the screwing efficiency.

10 Claims, 11 Drawing Sheets

(56) References Cited

U.S. PATENT DOCUMENTS

| | | | | |
|---|---|---|---|---|
| 5,120,172 A * | 6/1992 | Wakai | F16B 25/103 | |
| | | | | 411/387.8 |
| 5,273,383 A * | 12/1993 | Hughes | F16B 25/0015 | |
| | | | | 411/180 |
| 6,854,942 B1 * | 2/2005 | Hargis | F16B 25/0031 | |
| | | | | 411/369 |
| 7,090,453 B2 * | 8/2006 | Lin | F16B 25/0047 | |
| | | | | 411/387.1 |
| 8,348,573 B2 * | 1/2013 | Chang | F16B 25/0015 | |
| | | | | 411/387.1 |
| 8,480,342 B2 * | 7/2013 | Stiebitz | F16B 25/0015 | |
| | | | | 411/386 |
| 9,624,961 B2 * | 4/2017 | Lin | F16B 25/0015 | |
| 2006/0153662 A1 * | 7/2006 | Chen | F16B 25/0052 | |
| | | | | 411/387.1 |
| 2007/0286701 A1 * | 12/2007 | Hsu | F16B 25/0015 | |
| | | | | 411/387.1 |
| 2008/0232926 A1 | 9/2008 | Hsu | | |
| 2010/0119327 A1 * | 5/2010 | Lin | F16B 25/0084 | |
| | | | | 411/387.8 |
| 2012/0303074 A1 * | 11/2012 | Stiebitz | F16B 25/0015 | |
| | | | | 606/311 |
| 2013/0243547 A1 * | 9/2013 | Su | F16B 25/0063 | |
| | | | | 411/387.1 |
| 2015/0316088 A1 * | 11/2015 | Pearce | F16B 25/103 | |
| | | | | 411/387.7 |
| 2016/0120583 A1 * | 5/2016 | Bales | A61B 17/8625 | |
| | | | | 606/304 |
| 2017/0045075 A1 | 2/2017 | Hsu | | |

FOREIGN PATENT DOCUMENTS

| | | |
|---|---|---|
| TW | M466982 U | 12/2013 |
| TW | M547605 | 8/2017 |
| TW | M547607 | 8/2017 |

* cited by examiner

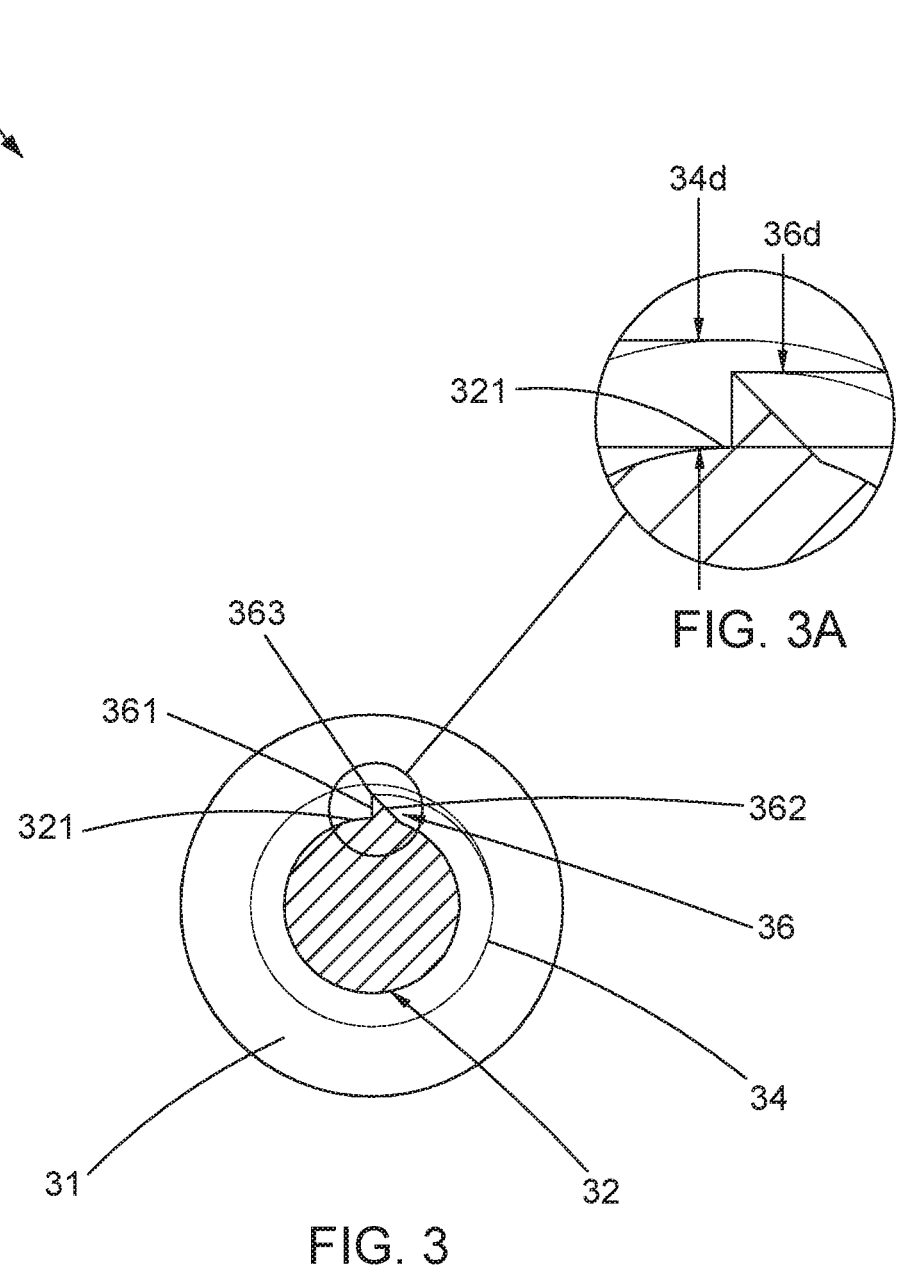

SCREW

BACKGROUND OF THE INVENTION

1. Field of the Invention

This invention relates to a screw and relates particularly to a screw capable of increasing the screwing efficiency.

2. Description of the Related Art

Referring to FIG. 1, a conventional fastener 1 comprises a head 11, a shank 12 extending downwards from the head 11, a drilling portion 13 connected to an end of the shank 12, and a threaded section 14 spirally disposed on the shank 12. During the screwing operation, a driving tool (not shown) is applied to rotate the head 11 to allow the drilling portion 13 which is rendered to touch a surface of an object 2 to start drilling. Simultaneously, the drilling portion 13 drives the threaded section 14 to move downwards. When the threaded section 14 contacts the object 2, the threaded section 14 starts cutting the object 2 to thread the shank 12 into the object 2 to complete the screwing operation of the conventional fastener 1.

During the screwing operation of the conventional fastener 1, the drilling portion 13 is rendered to press the object 2 firstly to carry out the movement of the threaded section 14. After the threaded section 14 reaches the object 2, the threaded section 14 executes the cutting action of the object 2. However, the threaded section 14 is unable to break fibers of the object 2. In other words, the fibers of the object 2 cannot be severed effectively by the threaded section 14 to result in the entanglement of the fibers around the shank 12. Meanwhile, the conventional fastener 1 keeps pressing the fibers while screwing into the object 2 to result in the enhanced drilling resistance and worsened screwing efficiency. Moreover, cut chips produced by cutting the object 2 are excluded through the thread 14 inefficiently and further accumulate in the object 2. The accumulated cut chips cause the laborious screwing operation when the conventional fastener 1 keeps screwing into the object 2. Furthermore, the object 2 may crack when the conventional fastener 1 keeps moving downwards and squeezing the accumulated cut chips. Thus, the conventional fastener 1 still needs to be improved.

SUMMARY OF THE INVENTION

The object of this invention is to provide a screw capable of reducing the drilling resistance to enhance the screwing efficiency.

The screw of this invention comprises a head, a shank extending downwards therefrom, a drilling portion connected to an end of the shank and opposite to the head, a first threaded section spirally disposed around the shank, and a leading threaded section spirally extending upwards from the drilling portion. A disconnection of the first threaded section and the leading threaded section defines a valley. At least one cutting unit extending upwards from the valley is connected to the first threaded section and the leading threaded section respectively. A protruding height of the cutting unit is smaller than a distance defined from the shank to an outermost edge of the first threaded section. Hence, during the beginning of the screwing operation, the leading threaded section cuts an object roughly when the drilling portion drills the object simultaneously. The cutting unit further positions and severs fibers which are not cut by the leading threaded section entirely. Therefore, the fibers will not hinder the screw from threading into the object. The friction between the first threaded section and the object is reduced effectively when the first threaded section continues cutting. Meanwhile, the fibers will not entwine around the shank to avoid slow drilling speed. Further, cut chips can be accommodated and excluded through the valley effectively to attain the smooth evacuation of the cut chips and enhance the accommodation effect of the cut chips. Whereby the drilling resistance is reduced and the engagement of the screw and the object is enhanced to increase the screwing efficiency.

Preferably, there is at least one auxiliary cutting unit projecting from the valley.

Preferably, the shank has a second threaded section spiraled thereon. The second shank has a helical direction opposite to a helical direction of the first threaded section.

Preferably, the drilling portion has an auxiliary threaded section extending from the drilling portion and situated between the leading threaded section. The auxiliary threaded section has a helical direction opposite to a helical direction of the leading threaded section.

Preferably, the cutting unit has a positioning wall projecting outwards from the valley, a guiding wall connected to the positioning wall, and a cutting edge formed at a connection of the positioning wall and the guiding wall.

Preferably, the positioning wall has a vertical surface. The guiding wall has a surface slanting from the cutting edge to the valley.

Preferably, the first threaded section ends at a first end. The leading threaded section ends at a second end. Two ends of the cutting unit are respectively connected to the first end and the second end.

BRIEF DESCRIPTION OF THE DRAWINGS

FIG. 3 is a bottom plan view as seen along the line A-A of FIG. 2;

FIG. 3A is an enlarged view showing a partial element of FIG. 3;

DETAILED DESCRIPTION OF THE PREFERRED EMBODIMENTS

Figure 1:
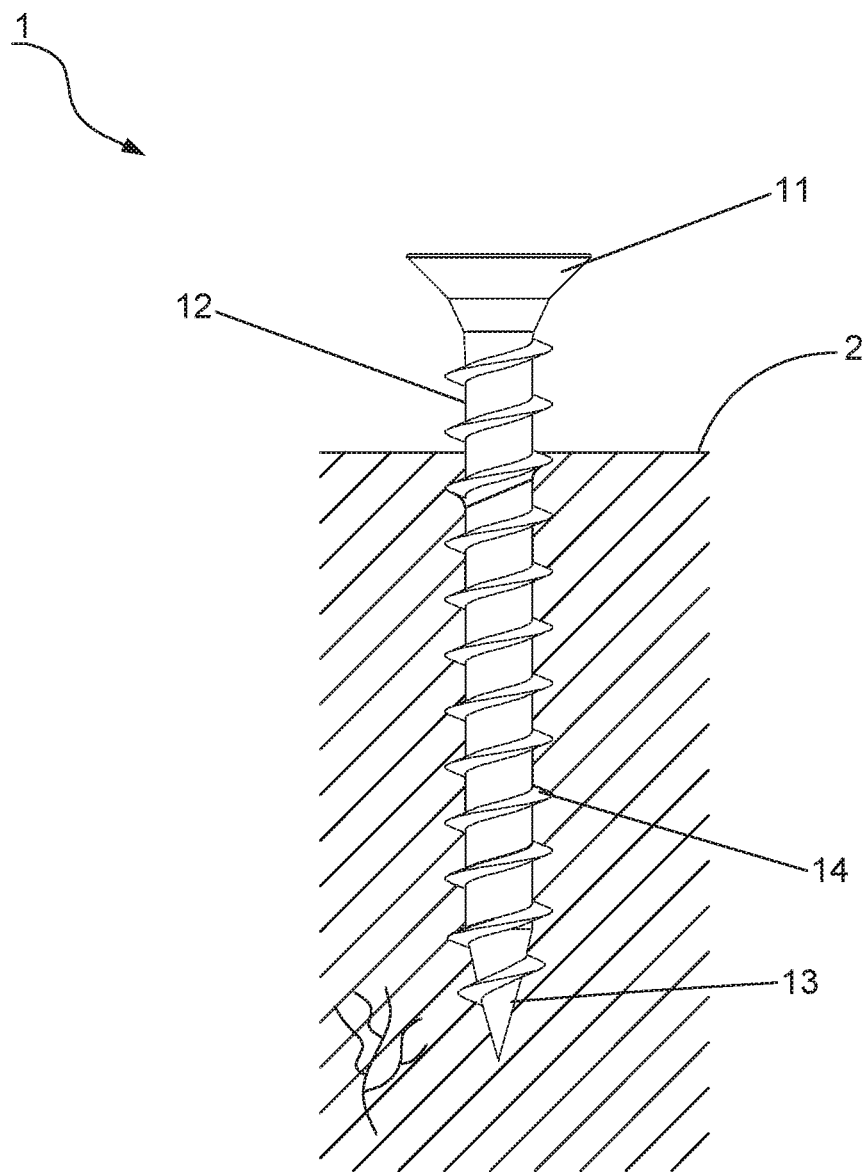
FIG. 1 is a schematic view showing a conventional fastener.
Figures 2, 2A:
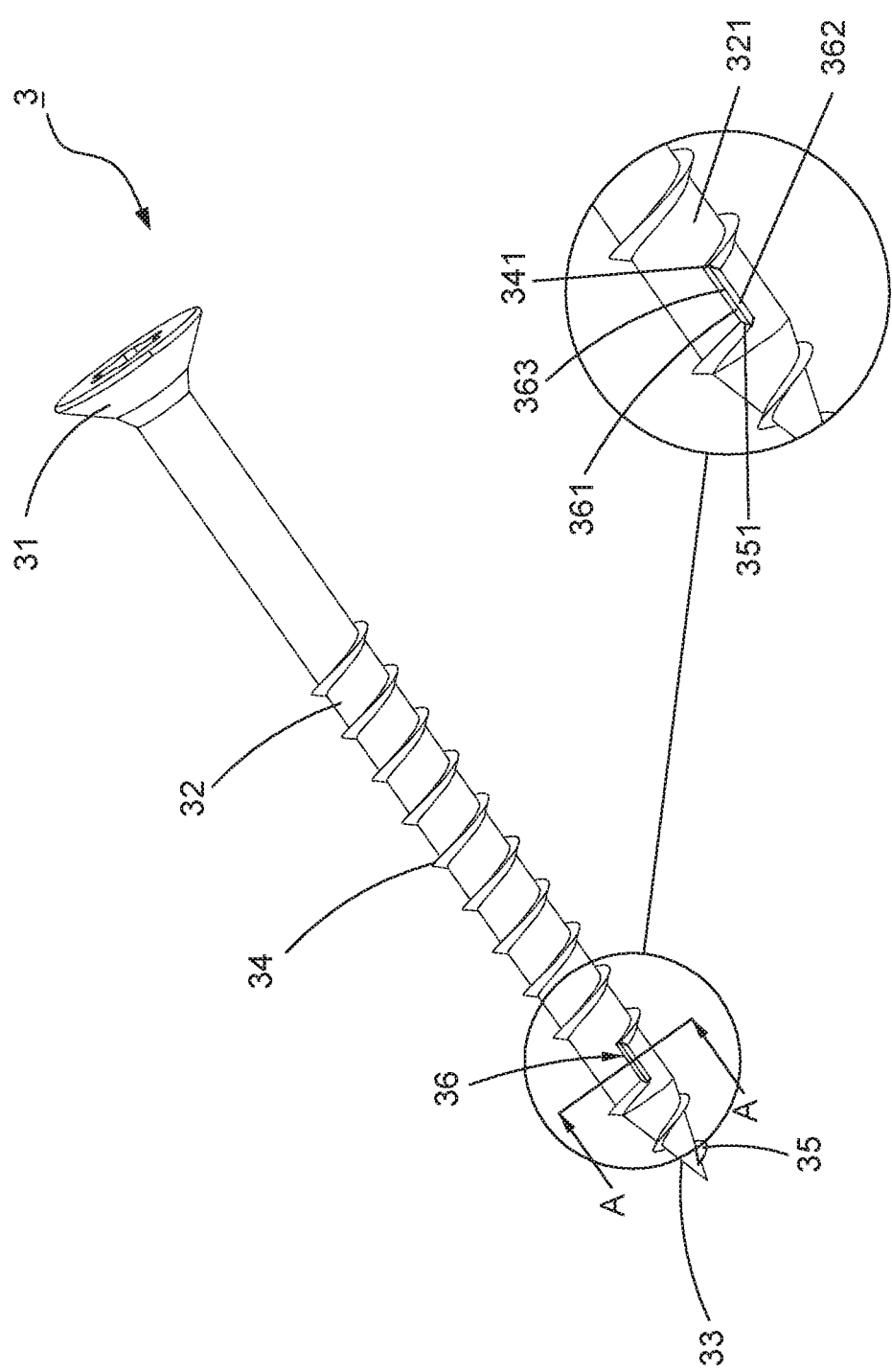
FIG. 2 is a schematic view showing a first preferred embodiment of this invention.
FIG. 2A is an enlarged view showing a partial element of FIG. 2.

Referring to FIG. 2, a first preferred embodiment of a screw 3 of this invention is disclosed. The screw 3 includes a head 31, a shank 32 extending downwards from the head 31, a drilling portion 33 fitted at an end of the shank 32 and opposite to the head 31, a first threaded section 34 spiraled on the shank 32, and a leading threaded section 35 helically extending upwards from the drilling portion 33. The first threaded section 34 and the leading threaded section 35 are separated from each other to define a valley 321 between the first threaded section 34 and the leading threaded section 35. Referring to FIG. 2A, in the preferred embodiments, the first threaded section 34 is continuously disposed around the shank 32 and terminates at a first end 341, and the leading threaded section 35 is helically disposed on the length of the drilling portion 33 and terminates at a second end 351. The second end 351 may be located on the drilling portion 33 or on the shank 32. The valley 321 is formed between the ends 341-351 of the first threaded section 34 and the leading threaded section 35. In other words, the valley 321 occupies a space between a last convolution of the first threaded section 34 and a last convolution of the leading threaded section 35. Certainly, the valley 321 may extend to cover parts of the drilling portion 33. Or, the valley 321 can be elongated by adjusting the locations of the first end 341 and the second end 351 to allow the valley 321 to accommodate more cut chips.

Referring to FIG. 2A, at least one cutting unit 36 projects from the valley 321. Two ends of the cutting unit 36 are respectively connected to the first end 341 of the first threaded section 34 and the second end 351 of the leading threaded section 35. Referring to FIG. 3 and FIG. 3A, a protruding height 36d of the cutting unit 36 is smaller than a distance 34d defined from the shank 32 to an outermost edge of the first threaded section 34. Meanwhile, in the preferred embodiments, the cutting unit 36 has a positioning wall 361 protruding outwards from the valley 321, a guiding wall 362 connected to the positioning wall 361, and a cutting edge 363 formed at a convergence of the positioning wall 361 and the guiding wall 362. The positioning wall 361 has a vertical surface. The guiding wall has a surface inclining from the cutting edge 363 to the valley 321.

Figure 4:
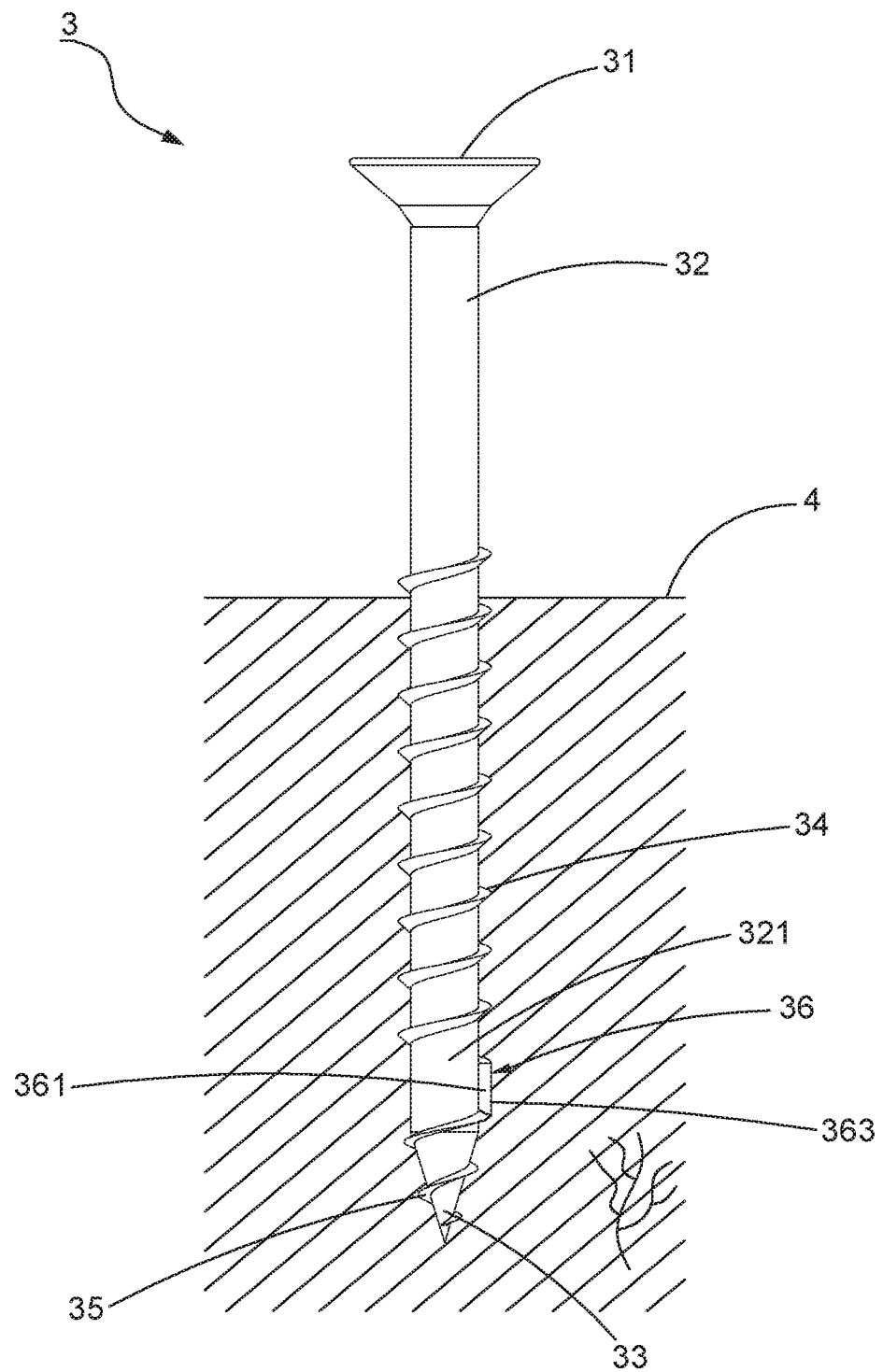
FIG. 4 is a schematic view showing the screwing operation of the first preferred embodiment.

Referring to FIG. 2 to FIG. 4, during the screwing operation of the screw 3, the drilling portion 33 is positioned against to an object 4 firstly. Then, the head 31 receives the rotation force from a driving tool (not shown) to carry out the drilling action of the drilling portion 33 into the object 4 and synchronously drive the leading threaded section 35 to cut the object 4. Hence, the leading threaded section 35 assists the drilling portion 33 in reaming and cutting the object 4 at the beginning of the screwing operation to allow the screw 3 to thread into the object 4 quickly. Besides, the leading threaded section 35 can cut fibers of the object 4 roughly while threading into the object 4 gradually to prevent the drilling portion 33 from being entwined by the fibers. When the screw 3 keeps threading into the object 4 to allow the cutting unit 36 to contact the object 4, the cutting unit 36 continues to cut the object 4 thoroughly. The positioning wall 361 presses and positions the remained fibers which are not severed by the leading threaded section 35 to allow the cutting edge 363 to break the fibers completely. The severed fibers are then evacuated through the guiding wall 362 to be accommodated in the valley 321. Further, the valley 321 assists in accelerating the evacuation of the cut chips through the first threaded section 34 to the outside. Because the leading threaded section 35 and the cutting unit 36 execute the cutting action of the object 4 sequentially to attain the double cutting effect, the fibers are severed effectively. Thus, the fibers will not hinder the screw 3 from threading into the object 4, thereby facilitating the screwing operation, increasing the screwing speed, and reducing the drilling resistance caused by the accumulated cut chips. Moreover, the cut chips can be evacuated along the valley 321 through the first threaded section 34 to the outside effectively, thereby achieving the smooth evacuation and preferable accommodation effect of the cut chips. Furthermore, the protruding height 36d is smaller than the distance 34d to prevent the cutting unit 36 from cutting the fibers of the object 4 beyond the limit. Meanwhile, the cutting unit 36 can press the fibers properly while threading into the object 4 to loosen the fibers and ream the object 4, thereby facilitating the following cutting and threading actions of the first threaded section 34. Hence, the screw 3 engages with the object 4 tightly. The screw 3 will not snap and the first threaded section 34 will not break during the screwing operation. Thus, the drilling resistance is reduced effectively. The cut chips are excluded smoothly to avoid slow drilling speed. Whereby the screwing efficiency is increased.

Figure 5:
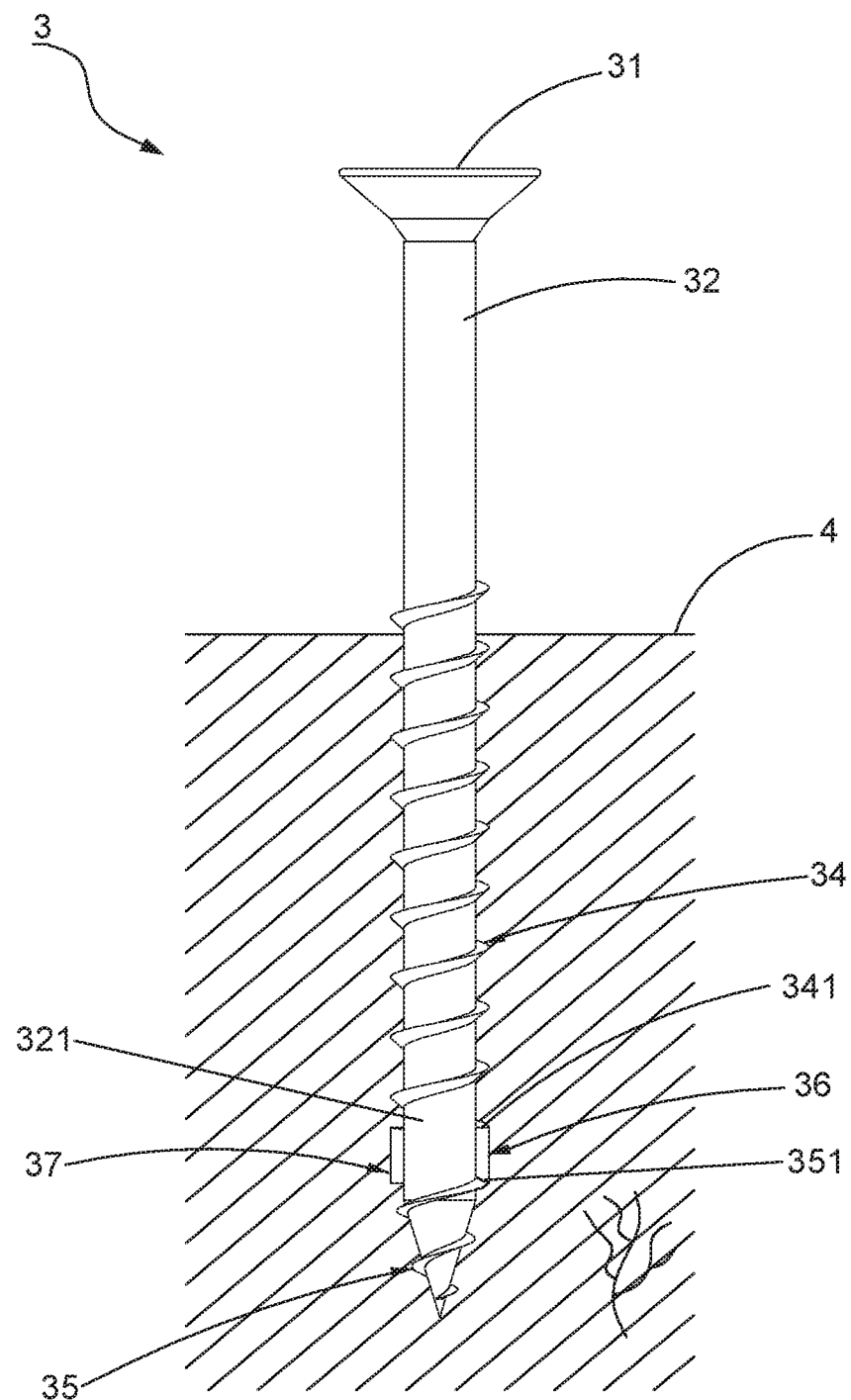
FIG. 5 is a schematic view showing a second preferred embodiment of this invention characterized by an auxiliary cutting unit.

Referring to FIG. 5 shows a second preferred embodiment of the screw 3 of this invention. The correlated elements and the concatenation of elements, the operation and objectives of the second preferred embodiment are the same as those of the first preferred embodiment. This embodiment is characterized in that at least one auxiliary cutting unit 37 projects from the valley 321. Two ends of the cutting unit 36 are still connected to the first end 341 and the second end 351 respectively. Contrarily, two ends of the auxiliary cutting unit 37 are disconnected from the first end 341 and the second end 351. Hence, the auxiliary cutting unit 37 assists the cutting unit 36 in cutting and reaming the object 4 at the beginning of the screwing operation, thereby accelerating the screwing operation. Thus, the screwing operation is facilitated. The screwing speed is increased. The drilling resistance is decreased greatly. Meanwhile, the friction between the screw 3 and the object 4 is reduced greatly to attain the smooth and fast screwing operation. Further, the engagement of the screw 3 and the object 4 is enhanced to increase the screwing efficiency.

Figure 6:
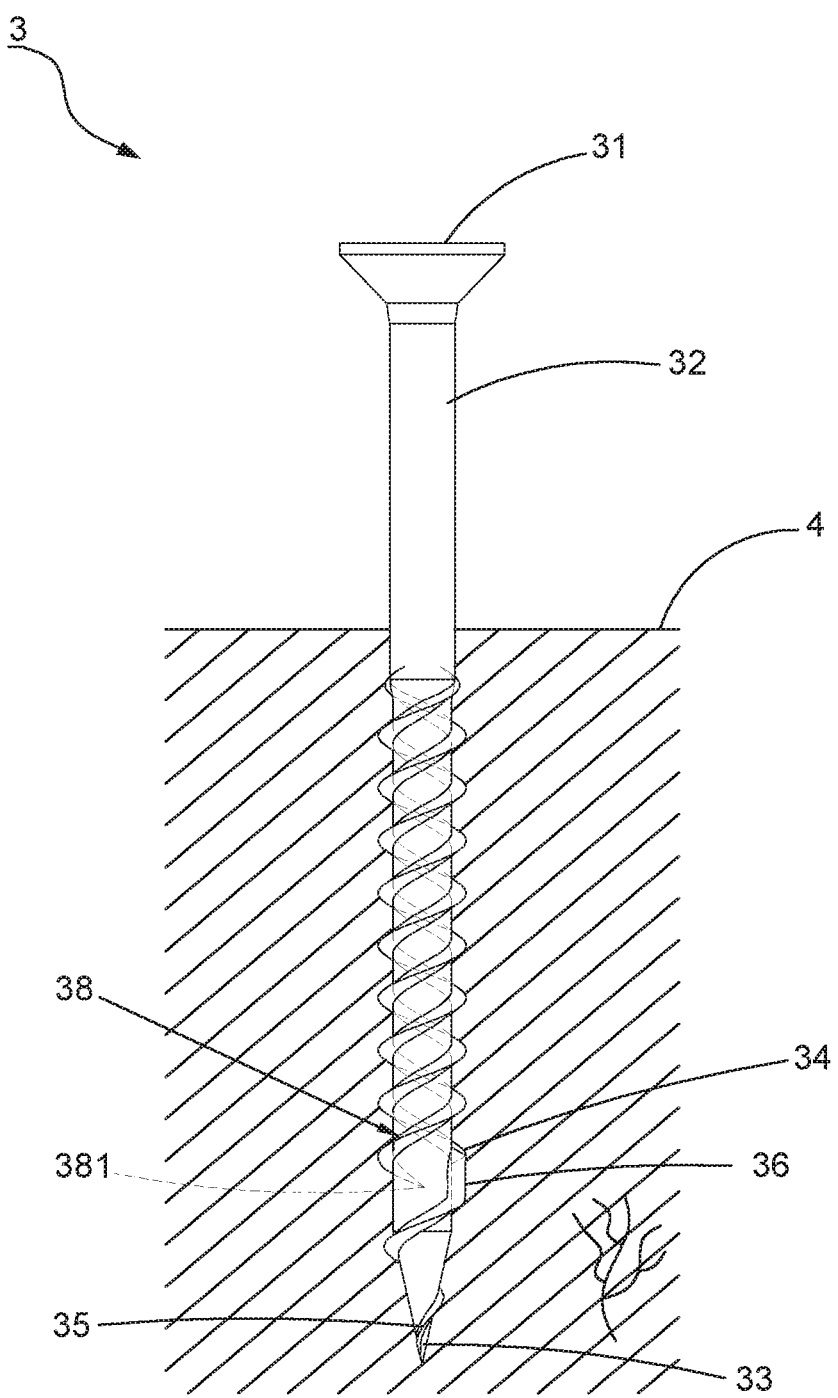
FIG. 6 is a schematic view showing a third preferred embodiment of this invention characterized by a second threaded section.
Figure 7:
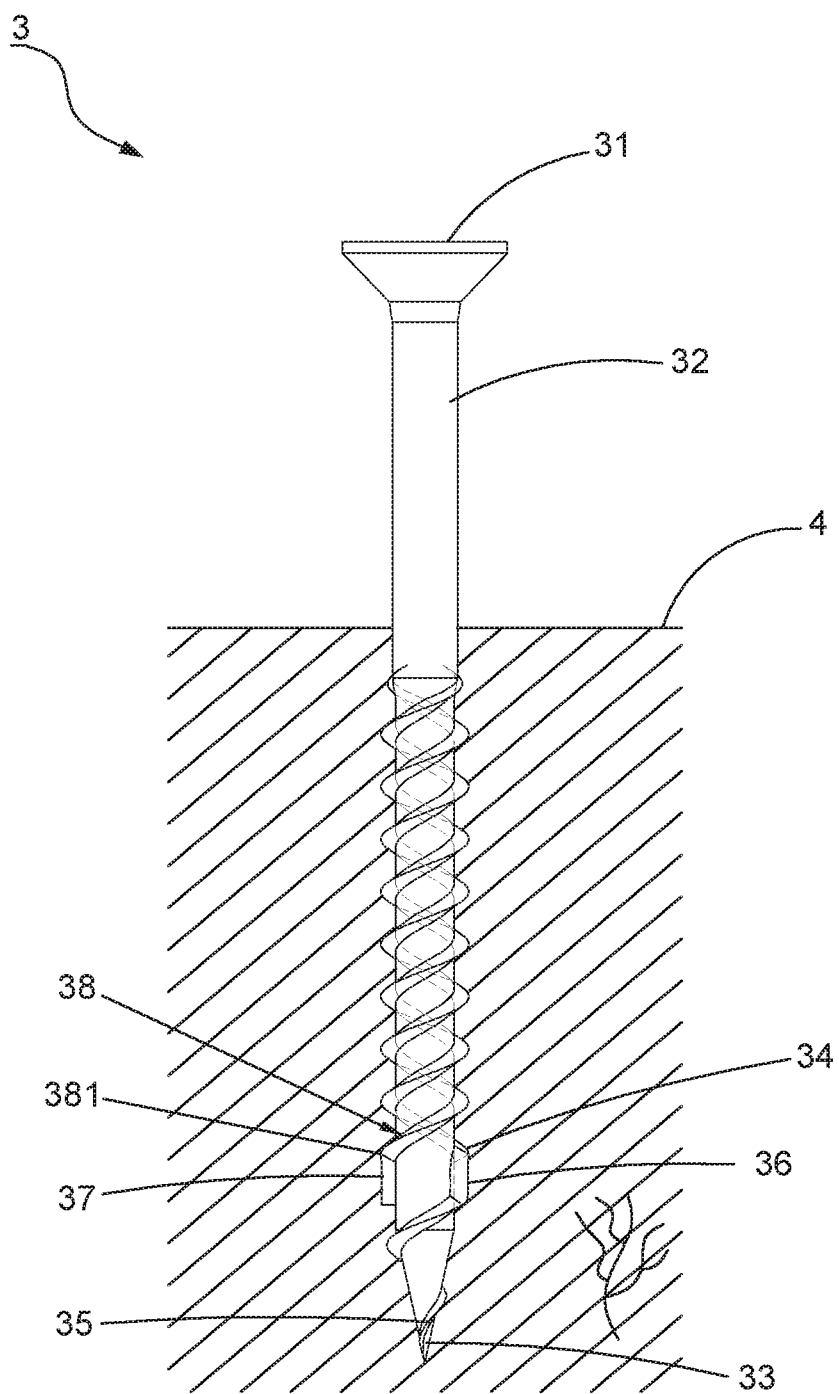
FIG. 7 is a schematic view showing a fourth preferred embodiment of this invention characterized in that an auxiliary cutting unit connected to a second threaded section.

Referring to FIG. 6 shows a third preferred embodiment of the screw 3 of this invention. The correlated elements and the concatenation of elements, the operation and objectives of the third preferred embodiment are the same as those of the first preferred embodiment. This embodiment is characterized in that the shank 32 has a second threaded section 38 helically formed on the shank 32 and situated between the first threaded section 34. The second threaded section 38 has a helical direction different from a helical direction of the first threaded section 34. In the preferred embodiments, the second threaded section 38 is helically disposed around the shank 32 and terminates at a third end 381. Meanwhile, the second threaded section 38 can be applied to different preferred embodiments. For example, the second threaded section 38 can combine with the structure of the aforementioned second preferred embodiment and then the third end 381 of the second threaded section 38 connects to one end of the auxiliary cutting unit 37 to construct a fourth preferred embodiment shown in FIG. 7. Hence, the set of alternating threaded sections, namely the first threaded section 34 alternating with the second threaded section 38 accelerates the drilling and cutting actions and increases the evacuation of the cut chips, thereby reducing the drilling resistance greatly, preventing the cut chips from accumulating in the object 4 and achieving the smooth screwing operation. Further, the engagement of the screw 3 and the object 4 is enhanced to increase screwing efficiency.

Figure 8:
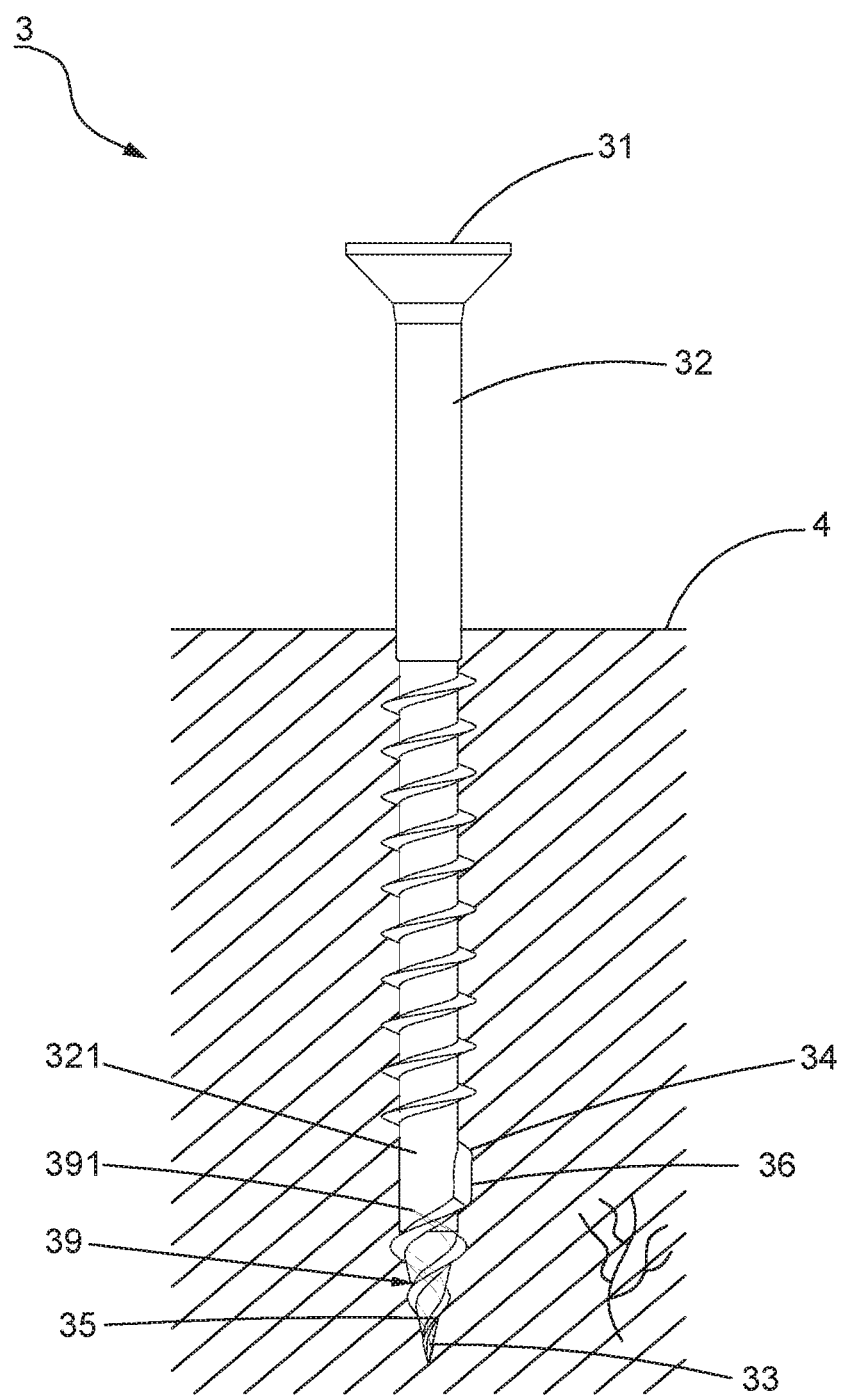
FIG. 8 is a schematic view showing a fifth preferred embodiment of this invention characterized by an auxiliary threaded section.
Figure 9:
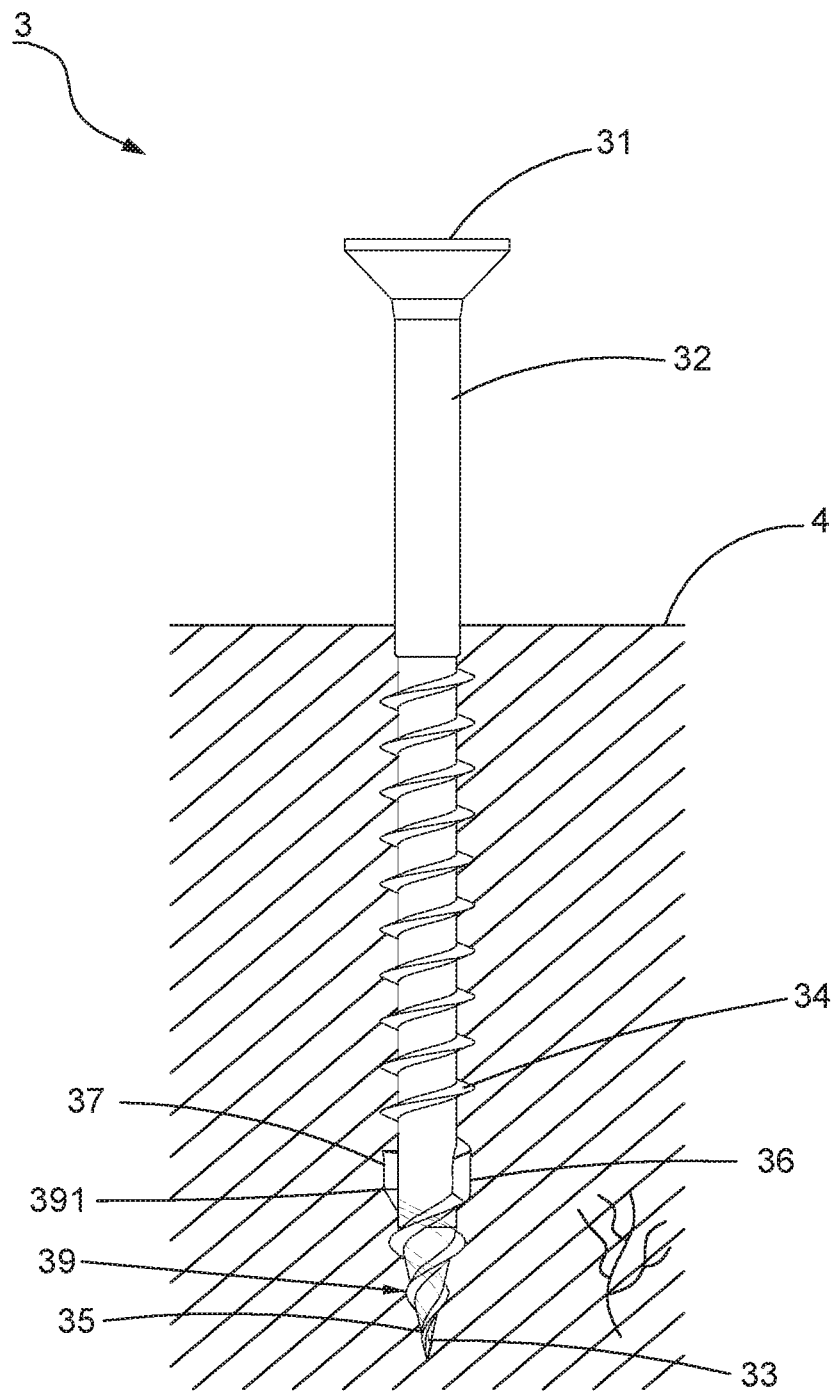
FIG. 9 is a schematic view showing a sixth preferred embodiment of this invention characterized in that an auxiliary threaded section connected to an auxiliary cutting unit.
Figure 10:
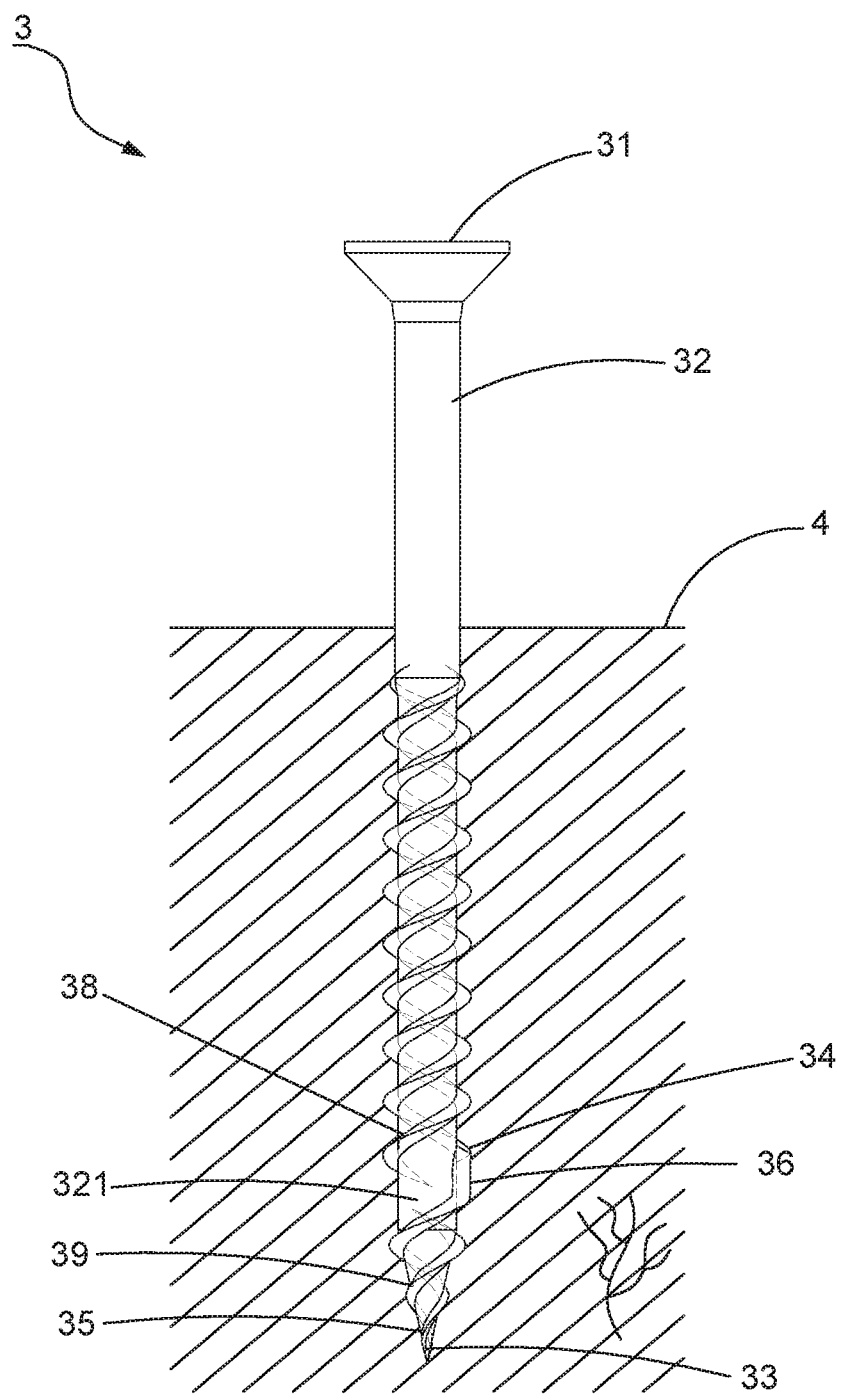
FIG. 10 is a schematic view showing a seventh preferred embodiment of this invention characterized in that an auxiliary threaded section and a second threaded section are disconnected.
Figure 11:
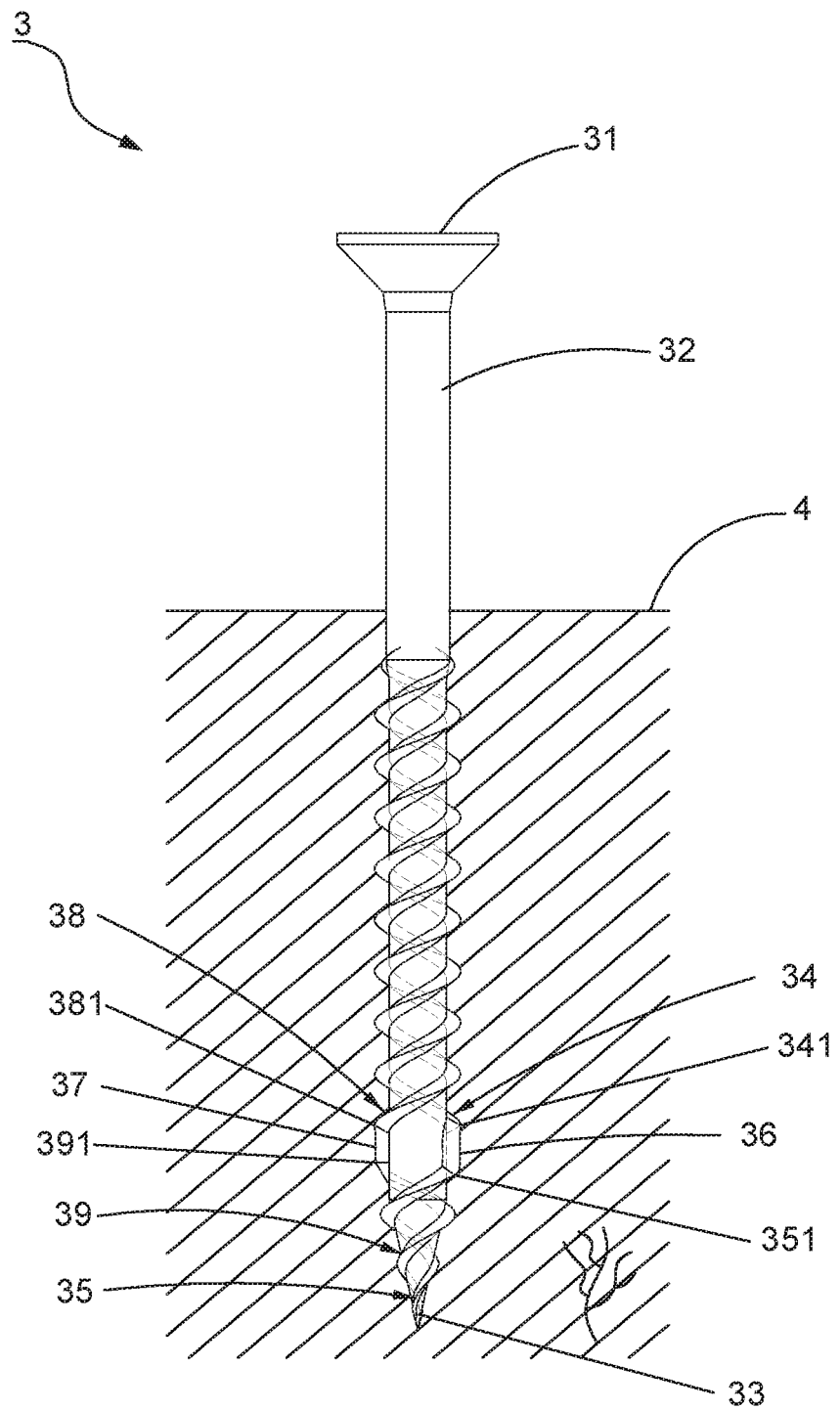
FIG. 11 is a schematic view showing an eighth preferred embodiment of this invention characterized in that an auxiliary threaded section, an auxiliary cutting unit connected thereto and a second threaded section connected to an end of the auxiliary cutting unit.

Referring to FIG. 8 shows a fifth preferred embodiment of the screw 3 of this invention. The correlated elements and the concatenation of elements, the operation and objectives of the fifth preferred embodiment are the same as those of the first preferred embodiment. This embodiment is characterized in that the drilling portion 33 has an auxiliary threaded section 39 extending upwards from the drilling portion 33 and situated between the leading threaded section 35. The auxiliary threaded section 39 has a helical direction different from a helical direction of the leading threaded section 35. In the preferred embodiments, the auxiliary threaded section 39 is helically disposed on the length of the drilling portion 33 and terminates at a fourth end 391. The fourth end 391 may be located on the drilling portion 33 or on the shank 32. Meanwhile, the auxiliary threaded section 39 can be applied to different preferred embodiments. For example, the auxiliary threaded section 39 can combine with the structure of the aforementioned second preferred embodiment and then the fourth end 391 of the auxiliary threaded section 39 connects to one end of the auxiliary cutting unit 37 to construct a sixth preferred embodiment shown in FIG. 9. It is also possible that the auxiliary threaded section 39 combines with the structure of the aforementioned third preferred embodiment to construct a seventh preferred embodiment shown in FIG. 10 wherein there are two sets of alternating threaded sections, namely the first threaded section 34 alternating with the second threaded section 38 and the leading threaded section 35 alternating with the auxiliary threaded section 39. Alternatively, as shown in an eighth preferred embodiment shown in FIG. 11, if there are two sets of alternating threaded sections, namely the first threaded section 34 alternating with the second threaded section 38 and the leading threaded section 35 alternating with the auxiliary threaded section 39, two ends of the cutting unit 36 are respectively connected to the first end 341 of the first threaded section 34 and the second end 351 of the leading threaded section 35, and two ends of the auxiliary cutting unit 37 are respectively connected to the third end 381 of the second threaded section 38 and the fourth end 391 of the auxiliary threaded section 39. Hence, the set of alternating threaded sections, namely the leading threaded section 35 alternating with the auxiliary threaded section 39 assists the drilling portion 33 in reaming and cutting the object 4 to increase the screwing speed of threading into the object 4 and reduce the drilling resistance at the beginning of the screwing operation. Whereby the screwing operation is facilitated and the tight engagement of the screw 3 and the object 4 is attained to achieve the better screwing efficiency.

To sum up, the screw of this invention takes advantages of the leading threaded section and at least one cutting unit which is connected to the first threaded section and the leading threaded section respectively to increase the screwing efficiency. The leading threaded section assists the drilling portion in cutting the fibers to prevent the drilling portion from being entwined by the fibers and reduce the drilling resistance at the beginning of the screwing operation. Meanwhile, the cutting unit can position and sever the fibers which are not cut by the leading threaded section effectively to prevent the screwing operation from being hindered caused by the entanglement of the fibers around the shank. Thus, the friction between the screw and the object is reduced to accelerate the screwing operation. The screw engages with the object firmly and the drilling resistance is reduced greatly. Further, the cut chips are accommodated and evacuated through the valley and the first threaded section smoothly. Whereby the preferable screwing efficiency is attained.

While the embodiments of this invention are shown and described, it is understood that further variations and modifications may be made without departing from the scope of this invention.

What is claimed is:

1. A screw comprising a head, a shank extending longitudinally from said head, a drilling portion connected to an end of said shank opposite to said head, a first threaded section spirally formed around said shank and extending a radial distance from a surface of said shank, and a leading threaded section spirally extending from said drilling portion toward said first threaded section, wherein said first threaded section and said leading threaded section are longitudinally spaced one from the other to form a valley between said first threaded section and said leading threaded section, said valley having a diameter equal to a diameter of said shank, at least one cutting unit protruding radially from a surface of said valley, two ends of said at least one cutting unit being respectively connected to corresponding ends of said first threaded section and said leading threaded section, said at least one cutting unit having a cutting edge at a radial protruding height thereof and extends between said corresponding ends of said first threaded section and said leading threaded section, said radial protruding height of said at least one cutting unit being less than said radial distance of said first threaded section.

2. The screw as claimed in claim 1, further comprising at least one auxiliary cutting unit protruding from said valley and angularly spaced from said at least one cutting unit.

3. The screw as claimed in claim 2, further comprising a second threaded section spirally formed on said shank and located between said first threaded section, said second threaded section having a helical direction different from a helical direction of said first threaded section, said second threaded section being connected to said at least one auxiliary cutting unit.

4. The screw as claimed in claim 3, further comprising an auxiliary threaded section extending from said drilling portion toward said first threaded section and located between said leading threaded section, said auxiliary threaded section having a helical direction different from a helical direction of said leading threaded section, two ends of said at least one auxiliary cutting unit being respectively connected to said second threaded section and said auxiliary threaded section.

5. The screw as claimed in claim 2, further comprising an auxiliary threaded section extending from said drilling portion toward said first threaded section and located between said leading threaded section, said auxiliary threaded section having a helical direction different from a helical direction of said leading threaded section, said auxiliary threaded section being connected to said at least one auxiliary cutting unit.

6. The screw as claimed in claim 1, further comprising a second threaded section spirally formed on said shank and located between said first threaded section, said second threaded section having a helical direction different from a helical direction of said first threaded section.

7. The screw as claimed in claim 6, further comprising an auxiliary threaded section extending from said drilling portion toward said first threaded section and located between said leading threaded section, said auxiliary threaded section having a helical direction different from a helical direction of said leading threaded section.

8. The screw as claimed in claim 1, further comprising an auxiliary threaded section extending from said drilling portion toward said first threaded section and located between said leading threaded section, said auxiliary threaded section having a helical direction different from a helical direction of said leading threaded section.

9. The screw as claimed in claim 1, wherein said at least one cutting unit has a positioning wall extending radially from said valley, a guiding wall connected to said positioning wall and extending therefrom to said valley, and said cutting edge being formed at a convergence of said positioning wall and said guiding wall.

10. The screw as claimed in claim 9, wherein said positioning wall has a vertical surface, said guiding wall having a surface sloping from said cutting edge to said valley.

* * * * *